No. 792,899. PATENTED JUNE 20, 1905.
H. J. HURD.
CENTRIFUGAL MACHINE.
APPLICATION FILED NOV. 10, 1904.

Witnesses. Inventor
H. J. Hurd

No. 792,899.                                                    Patented June 20, 1905.

UNITED STATES PATENT OFFICE.

HERBERT JAMES HURD, OF TORONTO, CANADA.

CENTRIFUGAL MACHINE.

SPECIFICATION forming part of Letters Patent No. 792,899, dated June 20, 1905.

Application filed November 10, 1904. Serial No. 232,163.

*To all whom it may concern:*

Be it known that I, HERBERT JAMES HURD, of the city of Toronto, in the county of York, in the Province of Ontario, Canada, have invented certain new and useful Improvements in Centrifugal Machines, of which the following is a specification.

My invention relates to centrifugal machines, or machines by which different substances are treated by being rapidly driven away from the center of a rapidly-rotating vessel by means of centrifugal action.

The principal objects of my invention are to provide an apparatus for instantly transferring a liquid into a solid substance, and, secondly, for causing the said solid substance to assume a filmy, flossy, or fibrous-like character.

My invention is particularly adapted for treating melted sugar or similar substances so that it may immediately take the form of a filmy, flossy, or fibrous mass, as if it had been spun into very fine or delicate threads or fibers.

My invention consists of the apparatus, devices, elements, and combination of devices and elements, as hereinafter described and shown.

Figure 1:
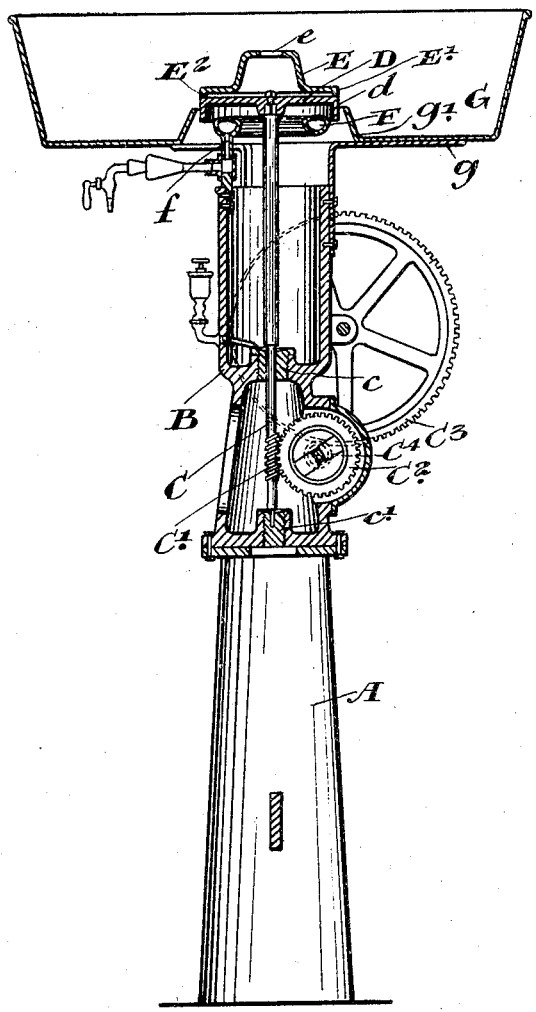
Figure 2:
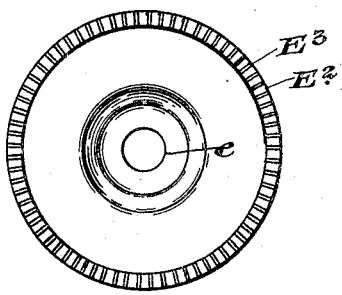

In the accompanying drawings, Figure 1 is a vertical section of an apparatus illustrating one embodiment of my invention. Fig. 2 is a plan view, enlarged, of the rotary receptacle as shown in Fig. 1 for the substance to be treated.

Similar letters represent like parts in both the figures.

A is the pedestal of the machine, and B an upwardly-extending portion thereof.

C is a central spindle journaled in suitable bearings $c$ and $c'$ and provided at the lower end with a worm $C'$, which meshes with a worm-wheel $C^2$, journaled in suitable bearings and driven by means of a gear $C^3$, which meshes with a pinion $C^4$ on the shaft of the worm-wheel $C^2$. The spindle C extends upwardly through the top of the portion B of the pedestal and has secured to its upward end a vessel or receptacle D E. The vessel D E is composed of a substantially flat or horizontal bottom D and the walls and top E, the latter having an inlet-opening $e$ and the bottom D provided with an annular rim $d$, depending from it. The part E converges toward its top and is provided between said converging portion and the bottom D with an outwardly-extending flange E and a wall or walls $E^2$, connecting said flange E with the bottom D. The wall or walls $E^2$ are provided with openings (preferably radial) at the junction with the bottom D. For convenience of construction, removal, and renewal the part D and the part E may be made separately.

F is a gas-burner, which may be circular and which surrounds the central spindle C and is suitably supported on a pipe $f$, which is provided with the usual gas taps or faucets.

G is a circular pan, which is supported on an arm $g$ and extends above and below the vessel or receptacle D E, and this pan G is provided with a circular opening in its bottom and with an annular flange $g'$, extending upwardly above said bottom and above the bottom of the rim $d$.

If a substance which has been reduced from a solid to a liquid by being melted or dissolved is placed in the vessel D E and said vessel is rapidly rotated upon its spindle C, the said liquid will be driven through the peripheral openings $E^3$ in the wall $E^2$, and as soon as said substance has reached the outside of said vessel D E it will assume a solid form again, and by means of the very rapid rotation of the vessel D E the substance will be spun into a filmy, flossy, and fibrous mass in the form of a ring around the vessel D E in the pan G.

If desired, the solid substance may be melted within the vessel D E by means of the gas-burner F, and said burner can keep the substance melted while it is in said vessel. If it be desired to treat a substance like sugar, the sugar may be placed within the vessel D E, then melted by the burner F, and said vessel D E rapidly rotated, when the melted sugar will be driven out through the peripheral openings $E^3$, and the filmy fibrous mass will be a spun ring of candy formed in the shape of a ring in the pan G around the vessel D E. The filmy mass produced will be so light that a very small quantity of the solid or liquid can produce a very great bulk of the filmy product.

My invention may be used for treating many articles besides sugar when it is desired to change the character of a liquid to a filmy fibrous non-compact mass.

My invention is not limited to the precise construction shown and described, as many changes may be made therein without departing from the spirit of my invention or sacrificing its chief advantages.

What I claim as new, and desire to secure by Letters Patent, is—

1. A centrifugal machine comprising a vertically-journaled rotary vessel for containing the material to be treated, said vessel having openings through its wall at its junction with the lowest portion of the bottom of the vessel for the passage of the material from the vessel.

2. A centrifugal machine comprising a vertically-journaled rotary vessel for containing the material to be treated, said vessel being open at its top to the outside air, and having openings through its wall at its junction with the lowest portion of the bottom of the vessel for the passage of the material from the vessel.

3. A centrifugal machine comprising a vertically-journaled rotary vessel for containing the material to be treated, said vessel having a substantially flat bottom and an upwardly-extending wall, and openings through said wall at its junction with said bottom for the passage of the material from the vessel.

4. A centrifugal machine comprising a vertically-journaled rotary vessel for containing the material to be treated, said vessel being contracted toward its top and having a flat bottom and an upwardly-extending wall, and openings through said wall at its junction with said bottom for the passage of the material from the vessel.

5. A centrifugal machine comprising a vertically-journaled rotary vessel for containing the material to be treated, said vessel being open at its top to the outside air, and having a substantially flat bottom and an upwardly-extending wall, and openings through said wall at the junction with said bottom for the passage of the material from the vessel.

6. A centrifugal machine comprising a vertically-journaled rotary vessel for containing the material to be treated, said vessel being contracted toward and open at its top, and having a substantially flat bottom and an upwardly-extending wall, and openings through said wall at its junction with said bottom for the passage of the material from the vessel.

7. A centrifugal machine comprising a vertically-journaled rotary vessel for containing the material to be treated, said vessel having an imperforate substantially flat bottom and an upwardly-extending wall, and openings through said wall at its junction with said bottom for the passage of the material from the vessel.

HERBERT JAMES HURD.

Witnesses:
B. BOYD,
E. B. SHEFFIELD.